(12) United States Patent
Henrikson et al.

(10) Patent No.: US 10,824,247 B1
(45) Date of Patent: Nov. 3, 2020

(54) HEAD-COUPLED KINEMATIC TEMPLATE MATCHING FOR PREDICTING 3D RAY CURSORS

(71) Applicant: FACEBOOK TECHNOLOGIES, LLC, Menlo Park, CA (US)

(72) Inventors: Rorik Henrikson, Toronto (CA); Tovi Grossman, Toronto (CA); Sean Trowbridge, Redmond, WA (US); Hrvoje Benko, Seattle, WA (US); Daniel Wigdor, Toronto (CA)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/560,874

(22) Filed: Sep. 4, 2019

Related U.S. Application Data

(60) Provisional application No. 62/828,897, filed on Apr. 3, 2019.

(51) Int. Cl.
| | | |
|---|---|---|
| *G06F 3/0346* | (2013.01) |
| *G06F 3/01* | (2006.01) |
| *G06F 9/451* | (2018.01) |
| *G06F 3/0481* | (2013.01) |
| *G06T 19/00* | (2011.01) |

(52) U.S. Cl.
CPC ............ *G06F 3/0346* (2013.01); *G06F 3/011* (2013.01); *G06F 3/012* (2013.01); *G06F 3/014* (2013.01); *G06F 3/017* (2013.01); *G06F 3/04815* (2013.01); *G06F 9/453* (2018.02); *G06T 19/003* (2013.01); *G06T 19/006* (2013.01)

(58) Field of Classification Search
CPC .......... G06F 3/011; G06F 3/012; G06F 3/014; G06F 3/017; G06F 3/0346; G06F 3/04815; G06F 9/453; G06T 19/003; G06T 19/006
See application file for complete search history.

(56) References Cited

U.S. PATENT DOCUMENTS

| | | | | |
|---|---|---|---|---|
| 9,348,419 B2 * | 5/2016 | Julian | ...................... | G06F 3/017 |
| 9,645,654 B2 * | 5/2017 | Perez | ...................... | G06F 3/017 |
| 9,646,201 B1 * | 5/2017 | Horowitz | ................ | G06T 7/246 |
| 9,659,403 B1 * | 5/2017 | Horowitz | ........... | G06K 9/00355 |
| 9,679,215 B2 * | 6/2017 | Holz | ................... | G06K 9/00201 |
| 9,696,795 B2 * | 7/2017 | Marcolina | ............... | G06F 3/011 |
| 9,740,242 B2 * | 8/2017 | Gordon | ................. | G06F 1/1635 |
| 9,767,613 B1 * | 9/2017 | Bedikian | ................. | G06F 3/147 |

(Continued)

*Primary Examiner* — Gene W Lee
(74) *Attorney, Agent, or Firm* — Morgan, Lewis & Bockius LLP

(57) ABSTRACT

An electronic device with a display selects a subset of templates from a library of templates. Each of the templates comprises logged movements of one or more predefined input device types in a 3D space and each template includes one or more movement parameters. The electronic device tracks, for a user, movement parameters of at least one input device of the user. The at least one input device corresponds to one of the predefined input device types. The electronic device compares the tracked movement parameters of the at least one input device of the user to the movement parameters for the subset of the templates selected from the library of templates. The electronic device predicts, based on the comparison, a goal target ray, within the 3D space. In some embodiments, the goal target ray is highlighted or visually emphasized according to the prediction.

20 Claims, 10 Drawing Sheets

(56) References Cited

U.S. PATENT DOCUMENTS

| | | | | |
|---|---|---|---|---|
| 9,778,752 B2* | 10/2017 | Holz | ................... | G06K 9/00201 |
| 9,785,247 B1* | 10/2017 | Horowitz | ............. | H04N 13/296 |
| 9,857,876 B2* | 1/2018 | Hare | ...................... | G06F 3/017 |
| 9,868,449 B1* | 1/2018 | Holz | .................... | B60W 50/10 |
| 9,886,097 B2* | 2/2018 | Horowitz | ............. | G06T 7/246 |
| 9,911,240 B2* | 3/2018 | Bedikian | ............... | G06F 1/1684 |
| 9,983,686 B2* | 5/2018 | Horowitz | ............. | G06F 3/0304 |
| 9,996,797 B1* | 6/2018 | Holz | ....................... | G06N 5/04 |
| 10,095,269 B2* | 10/2018 | Gordon | ................ | G06F 1/1694 |
| 10,156,909 B2* | 12/2018 | Kamiya | ................... | G06T 7/20 |
| 10,168,873 B1* | 1/2019 | Holz | ................... | G06F 3/04842 |
| 10,261,594 B2* | 4/2019 | Marcolina | ............... | G06F 3/011 |
| 10,318,010 B2* | 6/2019 | Horowitz | ........... | G06K 9/00214 |
| 10,330,935 B2* | 6/2019 | Shpunt | ................... | H04N 13/25 |
| 10,416,834 B1* | 9/2019 | Holz | .................. | G06F 3/04815 |
| 10,429,923 B1* | 10/2019 | Johnston | ................ | G06F 3/011 |
| 10,429,943 B2* | 10/2019 | Horowitz | ................ | G06F 3/017 |
| 10,607,413 B1* | 3/2020 | Marcolina | ............. | G06T 19/006 |
| 10,691,219 B2* | 6/2020 | Holz | .................... | G06K 9/2036 |
| 2009/0110237 A1* | 4/2009 | Wang | ..................... | G06F 3/017 |
| | | | | 382/103 |
| 2015/0169076 A1* | 6/2015 | Cohen | .................. | G06F 3/0304 |
| | | | | 345/156 |
| 2018/0052521 A1* | 2/2018 | Kamiya | .................. | G06F 3/011 |
| 2018/0210561 A1* | 7/2018 | Shigemori | ............ | G06F 3/0487 |
| 2020/0018926 A1* | 1/2020 | Saito | ........................ | G06F 3/01 |
| 2020/0167556 A1* | 5/2020 | Kaur | ....................... | G06F 3/167 |

\* cited by examiner (a) Controller Positional Velocity (CP)

(b) Controller Angular Velocity (CV)

(c) HMD Positional Velocity (HP)

(d) HMD Angular Velocity (HV)

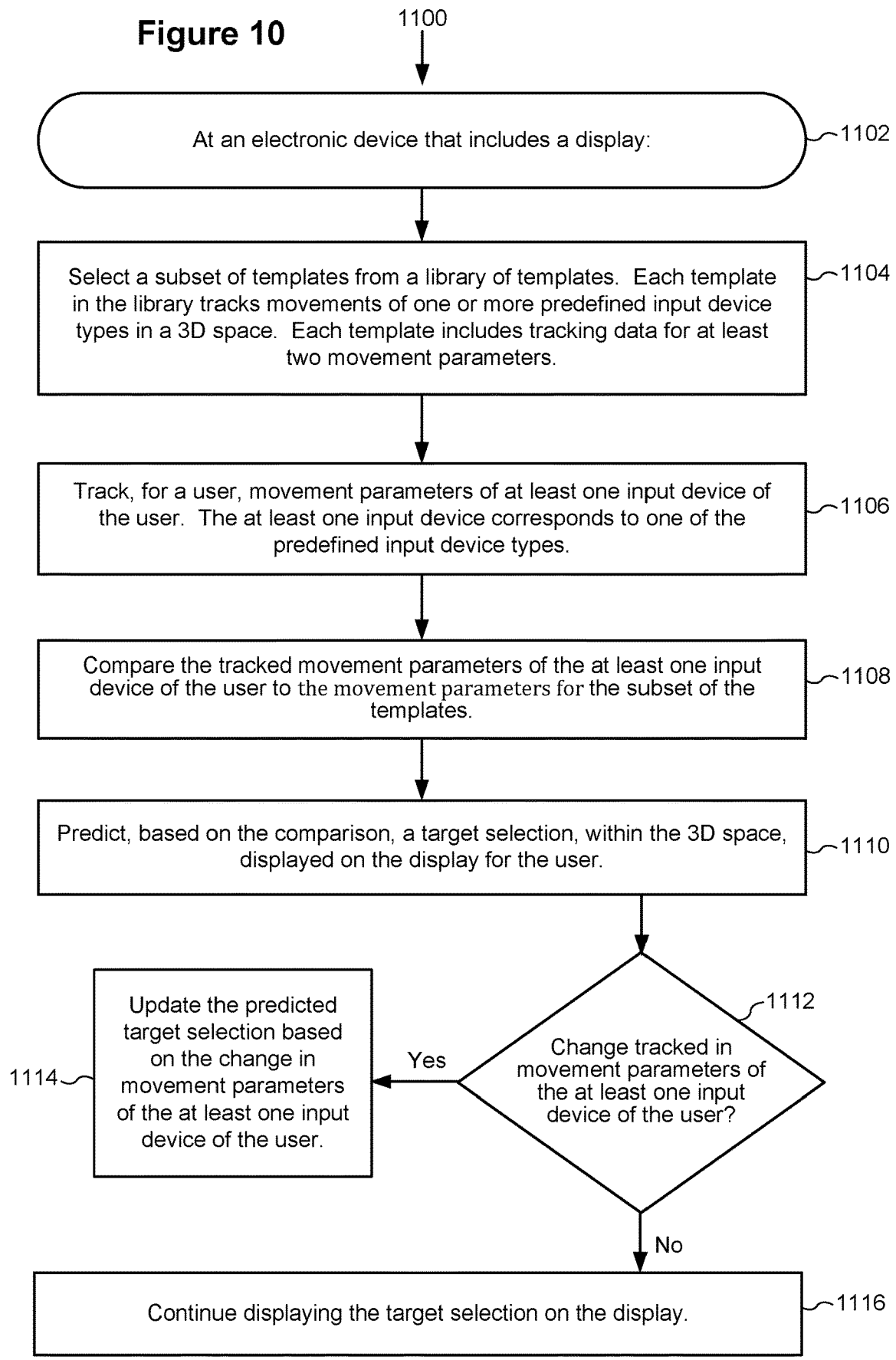

HEAD-COUPLED KINEMATIC TEMPLATE MATCHING FOR PREDICTING 3D RAY CURSORS

RELATED APPLICATION

The current application claims priority to U.S. Provisional Application Ser. No. 62/828,897, filed Apr. 3, 2019, entitled "Head-Coupled Kinematic Template Matching for Predicting 3D Ray Cursors," which is incorporated by reference herein in its entirety.

TECHNICAL FIELD

This application relates generally to gaming entertainment and artificial-reality systems, and more specifically to artificial-reality systems having a head-mounted display (HMD).

BACKGROUND

Artificial-reality devices have wide applications in various fields, including engineering design, medical surgery practice, military simulated practice, and video gaming. In the last several years, there has been significant increase in the popularity and availability of virtual reality (VR) technologies. Many human-computer interface interaction challenges are still prevalent. Specifically, target selection, one of the core tasks in VR systems, remains problematic due to the spatial nature of VR environments.

SUMMARY

In 2D environments, endpoint predictive models have been developed that could be used to facilitate pointing tasks. With such models, the system continuously analyzes the cursor trajectory as it moves towards an intended target, and tries to predict what the final endpoint of the trajectory will be. One technique, Kinematic Template Matching (KTM), matches cursor velocity to a library of templates from known movements, to predict end location. Such techniques, however, do not readily apply in a 3D space. In particular, 2D Kinematic Template Matching only considers the two-dimensional cursor trajectory to build and match template gestures.

Accordingly, there is a need to be able to predict the endpoint of a cursor in three-dimensional (3D) VR environments. Disclosed techniques provide endpoint prediction in 3D VR pointing. A method is provided to include alternative and additional input device types, such as head movement, in the templates used for KTM. This allows the prediction to be based on where users are looking, in addition to the cursor trajectory. The kinematics of the controller and the Head-Mounted Display (HMD) can be used together to predict the end point of the movement. The disclosed techniques can be applied for displays that are not head-mounted as well (e.g., large displays).

In some embodiments, the method includes tracking, during a ray cursor target acquisition movement, the velocity of both the controller and the head mounted display. These velocity profiles are matched to a library of templates to predict the final ray position.

(A1) In some embodiments, the solution explained above is implemented on an electronic device that includes a display, one or more processors, and memory storing one or more programs. The method includes selecting a subset of templates from a library of templates. Each template in the library of templates comprises logged movements of one or more predefined input device types in a 3D space and each template includes one or more movement parameters. The method includes tracking, for a user, movement parameters of at least one input device of the user. The at least one input device corresponds to one of the predefined input device types. (When there are two or more input devices, each input device corresponds to a respective one of the predefined device types.) The method includes comparing the tracked movement parameters of the at least one input device of the user to the movement parameters of the subset of the templates selected from the library of templates. The method further includes predicting, based on the comparison, a goal target ray, within the 3D space, which may be displayed on the display for the user.

(A2) In some embodiments of A1, the one or more movement parameters of each template comprise a positional velocity and an angular velocity of the one or more predefined input device types.

(A3) In some embodiments of A1, the subset of templates comprises seven of the templates from the library of templates. The seven templates are selected based on similarities between the seven templates and the tracked movement parameters of the at least one input device of the user.

(A4) In some embodiments of A1, comparing the tracked movement parameters of the at least one input device of the user to the subset of templates comprises generating a weighted score for each movement parameter of the tracked movement parameters.

(A5) In some embodiments of A4, the weights of the weighted score change dynamically for different portions of the user input (A6) In some embodiments of A1, the at least one input device of the user includes a hand of the user or a handheld controller of the user.

(A7) In some embodiments of A1, the at least one input device of the user includes a head (or HMD) of the user.

(A8) In some embodiments of A1, the at least one input device of the user includes a hand (e.g., or handheld controller) of the user and a head (e.g., or HMD) of the user, and the tracked movement parameters include movement parameters of the hand of the user and movement parameters of the head of the user.

(A9) In some embodiments of A1, the tracked movement parameters of the at least one input device of the user is not a full movement of the user.

(A10) In some embodiments of A1, the prediction is made based on only a first portion of the tracked movement parameters of the at least one input device of the user.

(A11) In some embodiments of A1, the electronic device displays, on the display, a visualization of the goal target ray based on the prediction. This can assist the user in reaching the goal target ray more quickly (or redirect the user's movement if the currently predicted target is incorrect).

(A12) In some embodiments of A11, the visualization comprises zooming or highlighting the predicted target.

(A13) In some embodiments of A1, the subset of templates is selected based in part on the user (e.g., stored characteristics of the user, user preferences, and/or historical data regarding user movements and selections in the 3D space).

(A14) In some embodiments of A1, the electronic device pre-fetches content corresponding to the goal target ray before the user makes the goal target ray. By knowing what a user is likely to select, the system can pre-fetch some data, which expedites the process when the selection actually occurs.

(A15) In some embodiments of A1, the movement parameters are tracked using accelerometers or other sensors on the at least one input device of the user.

(A16) In another aspect, an electronic device is provided that includes a display in communication with an artificial-reality device. The electronic device is configured to implement any of A1-A15.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 10 is a flow diagram showing a method of predicting a goal target ray in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first and second are used in some instances to describe various elements, these elements should not be limited by these terms. These terms are used only to distinguish one element from another. For example, a first input device could be termed a second input device, and, similarly, a second input device could be termed a first input device, without departing from the scope of the various described embodiments. The first input device and the second input device are both input devices, but they are not the same input device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when," "upon," "in response to determining," "in response to detecting," or "in accordance with a determination that," depending on the context. Similarly, the phrase "if it is determined" or "if [a stated condition or event] is detected" means "upon determining," "in response to determining," "upon detecting [the stated condition or event]," "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
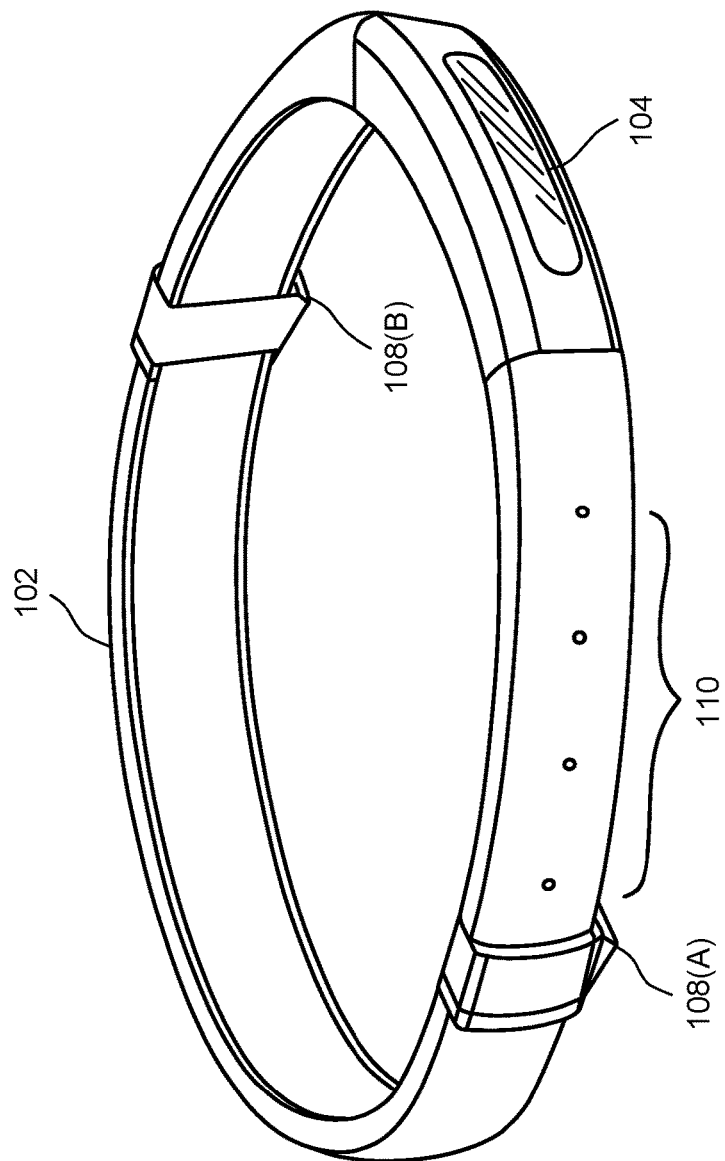
FIG. 1 illustrates an embodiment of an artificial-reality device.
Figure 2:
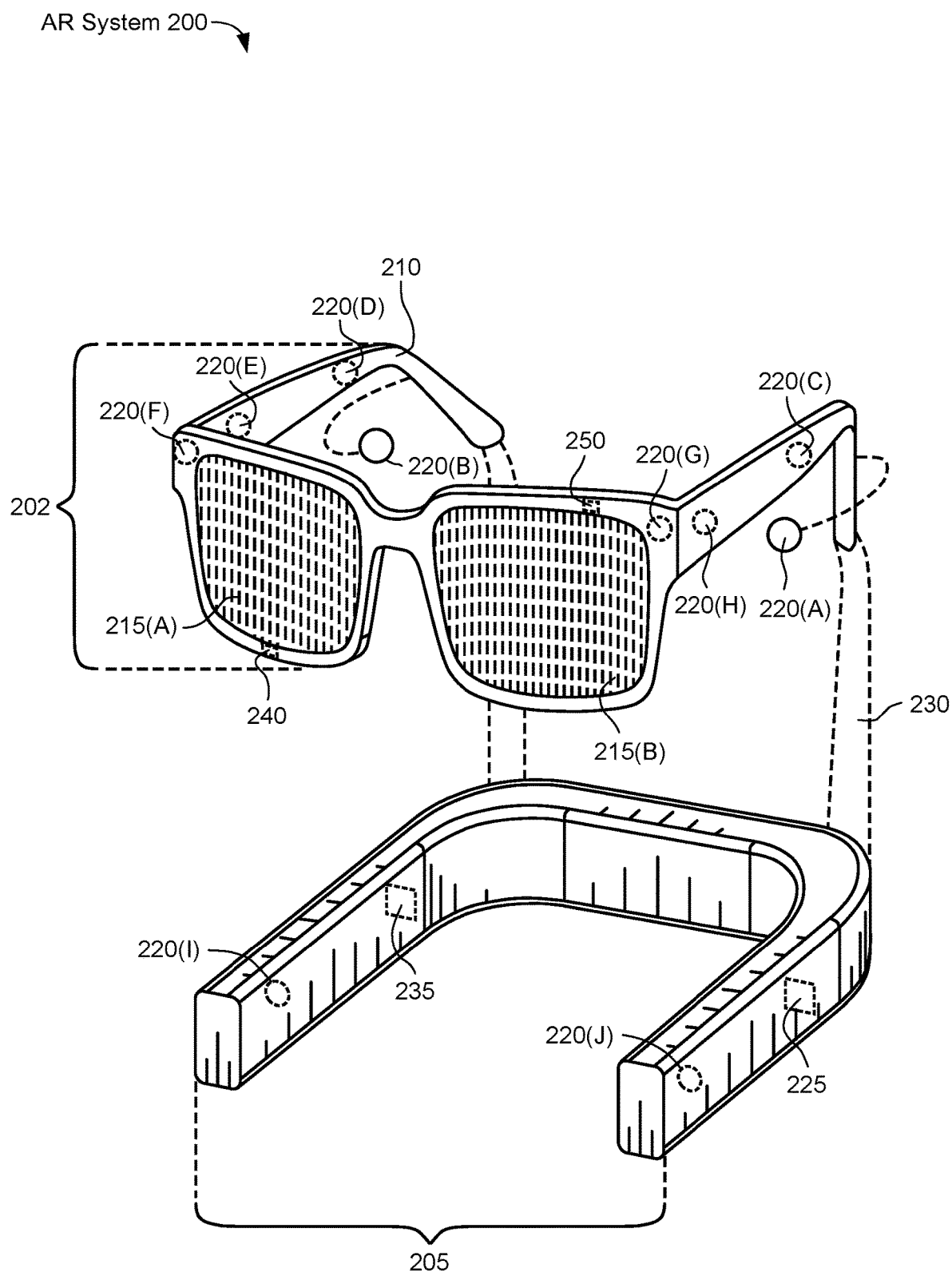
FIG. 2 illustrates an embodiment of an augmented-reality headset and a corresponding neckband.
Figure 3:
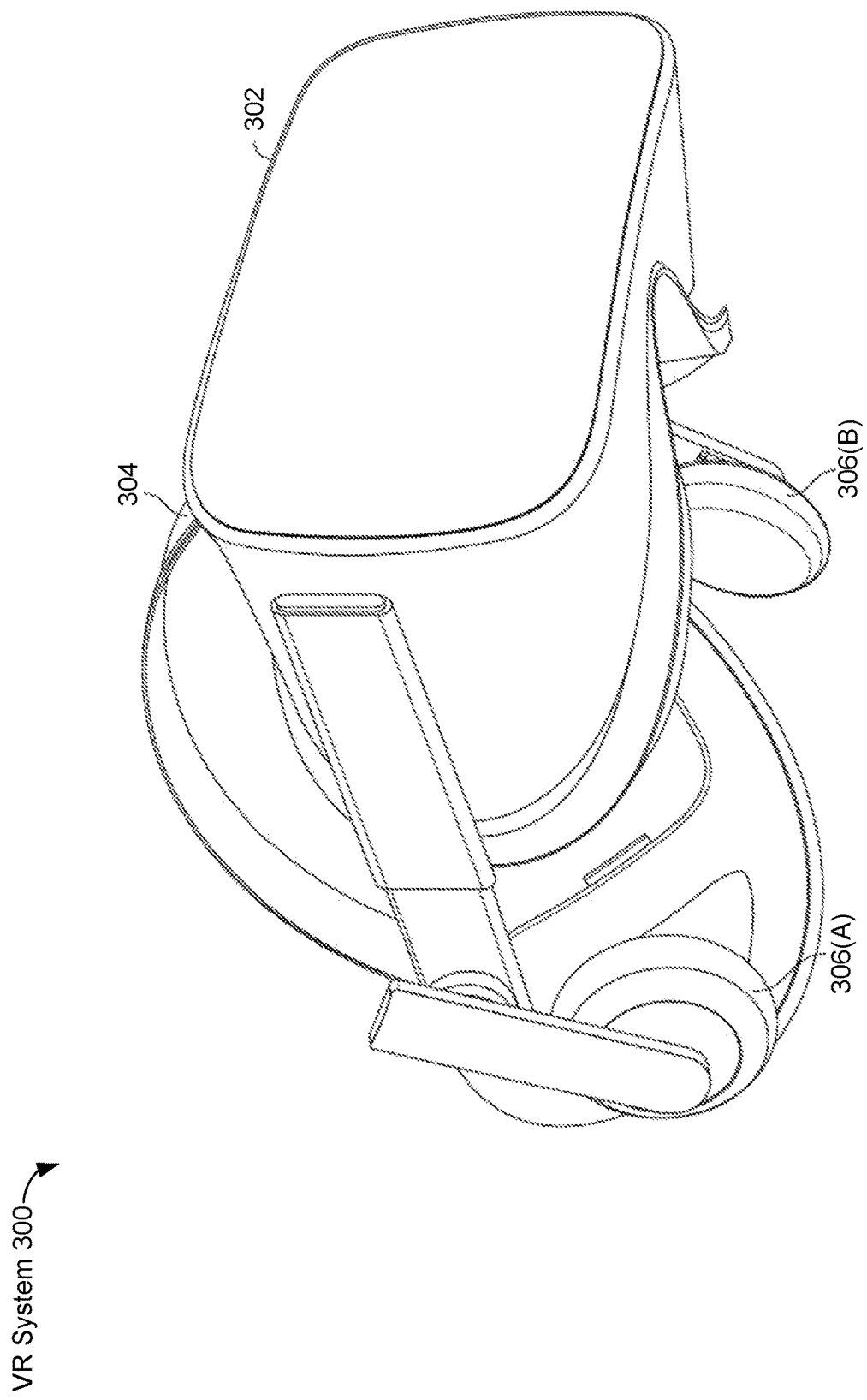
FIG. 3 illustrates an embodiment of a virtual-reality headset.

The following provides, with reference to FIGS. 1-3, detailed descriptions of various types of artificial-reality devices, which may facilitate and/or contribute to a user's artificial reality experience. Detailed descriptions of predicting an end point of a cursor movement are described with reference to FIGS. 4-9. The discussion corresponding to FIG. 10 provides detailed descriptions of an example method for predicting a goal target ray.

Embodiments of this disclosure may include or be implemented in conjunction with various types of artificial-reality systems and/or large display configurations (e.g., 32 or 34 inch video monitors). "Artificial reality" constitutes any form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect for a viewer). In some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial reality systems are designed to work without near-eye displays (NEDs), such as the AR system 100 in FIG. 1. Other artificial reality systems include an NED, which provides visibility into the real world (e.g., the AR system 200 in FIG. 2) or that visually immerses a user in an artificial reality (e.g., the VR system 300 in FIG. 3). While some artificial reality devices are self-contained systems, other artificial reality devices communicate and/or coordinate with external devices to provide an artificial reality experience to a user. Examples of such external devices include handheld controllers, mobile devices, desktop computers, devices worn by a user, devices worn by one or more other users, and/or any other suitable external system.

FIGS. 1-3 provide examples of artificial-reality devices. The AR system 100 in FIG. 1 generally represents a wearable device dimensioned to fit about a body part of a user. As shown, the AR system 100 includes a frame 102 (e.g., a band) and a camera assembly 104, which is coupled to the frame 102 and configured to gather information about a local environment by observing the local environment. The AR system 100 may also include one or more transducers. In one example, the AR system 100 includes output transducers 108(A) and 108(B) and input transducers 110. The output transducers 108(A) and 108(B) may provide audio feedback, haptic feedback, and/or content to a user, and the input audio transducers may capture audio (or other signals/waves) in a user's environment.

Thus, the AR system 100 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 100 may not include a NED, the AR system 100 may include other types of screens or visual feedback devices (e.g., a display screen integrated into a side of the frame 102).

The embodiments discussed in this disclosure may also be implemented in AR systems that include one or more NEDs. For example, as shown in FIG. 2, the AR system 200 may include an eyewear device 202 with a frame 210 configured to hold a right display device 215(A) and a left display device 215(B) in front of a user's eyes (the left and right display are also referred to herein as a "left lens" and a "right lens"). The display devices 215(A) and 215(B) may act together or independently to present an image or series of images to a user. While the AR system 200 includes two displays, embodiments of this disclosure may be implemented in AR systems with a single NED or more than two NEDs.

In some embodiments, the AR system 200 includes one or more sensors, such as the sensors 240 and 250. The sensors 240 and 250 may generate measurement signals in response to motion of the AR system 200 and may be located on substantially any portion of the frame 210. Each sensor may be a position sensor, an inertial measurement unit (IMU), a depth camera assembly, or any combination thereof. The AR system 200 may include zero or more sensors. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 200 may also include a microphone array with a plurality of acoustic sensors 220(A)-220(J), referred to collectively as the acoustic sensors 220. The acoustic sensors 220 may detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on the frame 210, and/or acoustic sensors 220(I) and 220(J), which may be positioned on a corresponding neckband 205.

The configuration of the acoustic sensors 220 of the microphone array may vary. While the AR system 200 is shown in FIG. 2 having ten acoustic sensors 220, the number of acoustic sensors 220 may be greater or less than ten. In some embodiments, using more acoustic sensors 220 may increase the amount of audio information collected and/or the sensitivity and accuracy of the audio information. In contrast, using a lower number of acoustic sensors 220 may decrease the computing power required by a controller 225 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

The acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of the acoustic sensors 220 on either side of a user's head (e.g., as binaural microphones), the AR device 200 may simulate binaural hearing and capture a 3D stereo sound field around about a user's head (e.g., capture 3D stereo sound generated by the right display 215(A) and/or the left display 215(B)). In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

The acoustic sensors 220 on the frame 210 may be positioned along the length of the temples, across the bridge, above or below the display devices 215(A) and 215(B), or some combination thereof. The acoustic sensors 220 may be oriented such that the microphone array is able to detect sounds in a wide range of directions surrounding the user wearing AR system 200. In some embodiments, an optimization process may be performed during manufacturing of the AR system 200 to determine relative positioning of each acoustic sensor 220 in the microphone array.

The AR system 200 may further include one or more transducers (e.g., mechanical oscillators), which may be collectively referred to as a transducer array. In some embodiments, each transducer includes hardware capable of generating signals (e.g., mechanical waves such as soundwaves, ultrasound waves, or other waves and signals, such as electromagnetic waves). For example, each transducer can convert electrical signals into ultrasound waves (or various other waves). The transducers may be miniature piezoelectric transducers, capacitive transducers, single or multipole voice coil motors, and/or any other suitable device for creation of signals. The one or more transducers are configured to generate signals that vibrate one or more of the frame 210, the right display 215(A), and the left display 215(B).

The AR system 200 may further include or be connected to an external device (e.g., a paired device), such as a neckband 205. As shown, the neckband 205 may be coupled to the eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of the eyewear device 202 and the neckband 205 in example locations on the eyewear device 202 and the neckband 205, the components may be located elsewhere and/or distributed differently on the eyewear device 202 and/or the neckband 205. In some embodiments, the components of the eyewear device 202 and the neckband 205 may be located on one or more additional peripheral devices paired with the eyewear device 202, the neckband 205, or some combination thereof. Furthermore, the neckband 205 generally represents any type or form of paired device. Thus, the following discussion of neckband 205 also applies to various other paired devices, such as smart watches, smart phones, wrist bands, other wearable devices, hand-held controllers, tablet computers, or laptop computers.

Pairing external devices, such as a neckband 205, with AR eyewear devices may enable the eyewear devices to achieve the form factor of a pair of glasses while still providing sufficient battery and computation power for expanded capabilities. Some or all of the battery power, computational resources, and/or additional features of the AR system 200 may be provided by a paired device or shared between a paired device and an eyewear device, thus reducing the weight, heat profile, and form factor of the eyewear device overall while still retaining desired functionality. For example, the neckband 205 may allow components that would otherwise be included on an eyewear device to be included in the neckband 205 because users may tolerate a heavier weight load on their shoulders than they would tolerate on their heads. The neckband 205 may also have a larger surface area over which to diffuse and disperse heat to the ambient environment. Thus, the neckband 205 may allow for greater battery and computation capacity than might otherwise have been possible on a stand-alone eyewear device. Because weight carried in the neckband 205 may be less invasive to a user than weight carried in the eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 205 may be communicatively coupled with the eyewear device 202 and/or to other devices. The other devices may provide certain functions (e.g., tracking, localizing, depth mapping, processing, or storage) to the AR system 200. In the embodiment of FIG. 2, the neckband 205 includes two acoustic sensors 220(I) and 220(J), which are part of the microphone array (or potentially form their own microphone subarray). The neckband 205 may also include a controller 225 and a power source 235.

The acoustic sensors 220(I) and 220(J) of the neckband 205 may be configured to detect sound and convert the detected sound into an electronic format (analog or digital). In the embodiment of FIG. 2, the acoustic sensors 220(I) and 220(J) are positioned on the neckband 205, thereby increasing the distance between neckband acoustic sensors 220(I) and 220(J) and the other acoustic sensors 220 positioned on the eyewear device 202. In some cases, increasing the distance between the acoustic sensors 220 of the microphone array improves the accuracy of beamforming performed via the microphone array. For example, if a sound is detected by the acoustic sensors 220(C) and 220(D) and the distance between acoustic sensors 220(C) and 220(D) is greater than, for example, the distance between the acoustic sensors 220(D) and 220(E), the determined source location of the detected sound may be more accurate than if the sound had been detected by the acoustic sensors 220(D) and 220(E).

The controller 225 of the neckband 205 may process information generated by the sensors on the neckband 205 and/or the AR system 200. For example, the controller 225 may process information from the microphone array, which describes sounds detected by the microphone array. For each detected sound, the controller 225 may perform a direction of arrival (DOA) estimation to estimate a direction from which the detected sound arrived at the microphone array. As the microphone array detects sounds, the controller 225 may populate an audio data set with the information (e.g., which may be used to adjust operation of the transducers). In embodiments in which the AR system 200 includes an IMU, the controller 225 may compute all inertial and spatial calculations from the IMU located on the eyewear device 202. The connector 230 may convey information between the AR system 200 and the neckband 205 and between the AR system 200 and the controller 225. The information may be in the form of optical data, electrical data, wireless data, or any other transmittable data form. Moving the processing of information generated by the AR system 200 to the neckband 205 may reduce weight and heat in the eyewear device 202, making it more comfortable to a user.

The power source 235 in the neckband 205 may provide power to the eyewear device 202 and/or to the neckband 205. The power source 235 may include, without limitation, lithium-ion batteries, lithium-polymer batteries, primary lithium batteries, alkaline batteries, or any other form of power storage. In some cases, the power source 235 is a wired power source. Including the power source 235 on the neckband 205 instead of on the eyewear device 202 may help better distribute the weight and heat generated by the power source 235.

As noted, some artificial reality systems may, instead of blending an artificial reality with actual reality, substantially replace one or more of a user's sensory perceptions of the real world with a virtual experience. One example of this type of system is a head-worn display system, such as the VR system 300 in FIG. 3, which mostly or completely covers a user's field of view. The VR system 300 may include a front rigid body 302 and a band 304 shaped to fit around a user's head. The VR system 300 may also include output audio transducers 306(A) and 306(B). Furthermore, while not shown in FIG. 3, the front rigid body 302 may include one or more electronic elements, including one or more electronic displays, one or more IMUs, one or more tracking emitters or detectors, and/or any other suitable device or system for creating an artificial reality experience.

Artificial-reality systems may include a variety of types of visual feedback mechanisms. For example, display devices in the AR system 200 and/or the VR system 300 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial reality systems also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 200 and/or the VR system 300 may include micro-LED projectors that project light (e.g., using a waveguide) into display devices, such as clear combiner lenses, which allow ambient light to pass through. The display devices may refract the projected light toward a user's pupil and may enable a user to simultaneously view both artificial reality content and the real world. Artificial-reality systems may also be configured with any other suitable type or form of image projection system.

Artificial-reality systems may also include various types of computer vision components and subsystems. For example, the AR system 100, the AR system 200, and/or the VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 1 and 3, the output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 110 may include condenser microphones, dynamic microphones, ribbon microphones, and/or any other type or form of input transducer. In some embodiments, a single transducer may be used for both audio input and audio output. In some embodiments, transducers (e.g., voice coils, piezoelectrics, and the like) are coupled to the displays of AR/VR systems, and the transducers transform the displays into output audio devices (i.e., speakers).

The artificial-reality systems shown in FIGS. 1-3 may include tactile (i.e., haptic) feedback systems, which may be incorporated into headwear, gloves, body suits, handheld controllers, environmental devices (e.g., chairs or floormats), and/or any other type of device or system. Additionally, in some embodiments, the haptic feedback systems may be incorporated with the artificial reality systems. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms, as described herein. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 100, 200, and 300) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

The artificial reality systems described above in connection with FIGS. 1-3 may also include memory (e.g., the neckband 205 in FIG. 2 may include memory). The memory may be high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within the memory, includes a non-transitory computer-readable storage medium. In some embodiments, the memory, or the non-transitory computer-readable storage medium of the memory stores the following programs, modules, and data structures, or a subset or superset thereof:

operating logic, including procedures for handling various basic system services and for performing hardware dependent tasks;

a communication module for coupling to and/or communicating with other devices (e.g., an artificial-reality headset, remote server, or other artificial-realty system) in conjunction with a communication interface (wired or wireless interface);

an artificial-reality generation module, which is used for generating artificial-reality images, including potential targets, and sending corresponding video and audio data to the headset and transducers. In some embodiments, the artificial-reality generation module is a virtual-reality generation module, an augmented-reality generation module, a mixed-reality generation module, or some combination thereof;

an HRTF ("Head-Related Transfer Function") generation module, which is used for computing HRTF filters based on sound profiles (e.g., energy contributions) of audio sources;

an audio output module, which is used for convolving the computed HRTF filters with dry input sound to produce final audio data;

a signal generating module, which generates signals (e.g., in conjunction with transducers and the audio output module) signals. In some embodiments, the signal generating module includes a characteristics selection module, which is used for selecting values of signals characteristics for signals generated by the transducers;

a display module, which is used for displaying media (e.g., virtual-reality images, augmented-reality images, and/or mixed-reality images) in conjunction with the headset; and one or more databases, which store data, including:
spherical harmonic HRTF coefficients;
artificial-reality applications;
communication protocol information for storing and managing protocol information for one or more protocols (e.g., custom or standard wireless protocols, such as ZigBee or Z-Wave, and/or custom or standard wired protocols, such as Ethernet);
parameters describing anatomical features of one or more users; and
a library of templates (e.g., for each user and/or a general library of templates for a plurality of users) that can be matched with a user input to predict a goal target ray.

In some embodiments, the memory also includes a feature identification module, which receives images of the user captured by a camera and identifies a set of anatomical features from the images, which describe physical characteristics of a user relevant to the user's HRTF. The set of anatomical features may include, for example, the head diameter, shoulder width, height, and shape and size of the pinnae. The anatomical features may be identified through any image processing or analysis algorithm.

In some embodiments, the artificial-reality applications are implemented as software modules, which are stored on the storage device and executed by the processor. Each artificial-reality application is a group of instructions that, when executed by a processor of the artificial reality system, generates artificial-reality content (e.g., images, audio, or haptic feedback) for presentation to the user. An artificial-reality application may generate artificial-reality content in response to inputs received from the user via movement of the headset.

Each of the above identified elements may be stored in one or more of the previously mentioned memory devices, and corresponds to a set of instructions for performing the function(s) described. The above identified modules or programs (e.g., sets of instructions) need not be implemented as separate software programs, procedures, or modules, and thus various subsets of these modules can be combined or otherwise rearranged in various embodiments. In some embodiments, the memory stores a subset of the modules and data structures identified above.

The artificial-reality systems described above in connection with FIGS. 1-3 may facilitate and/or contribute to artificial-reality experiences for users.

Figure 4:
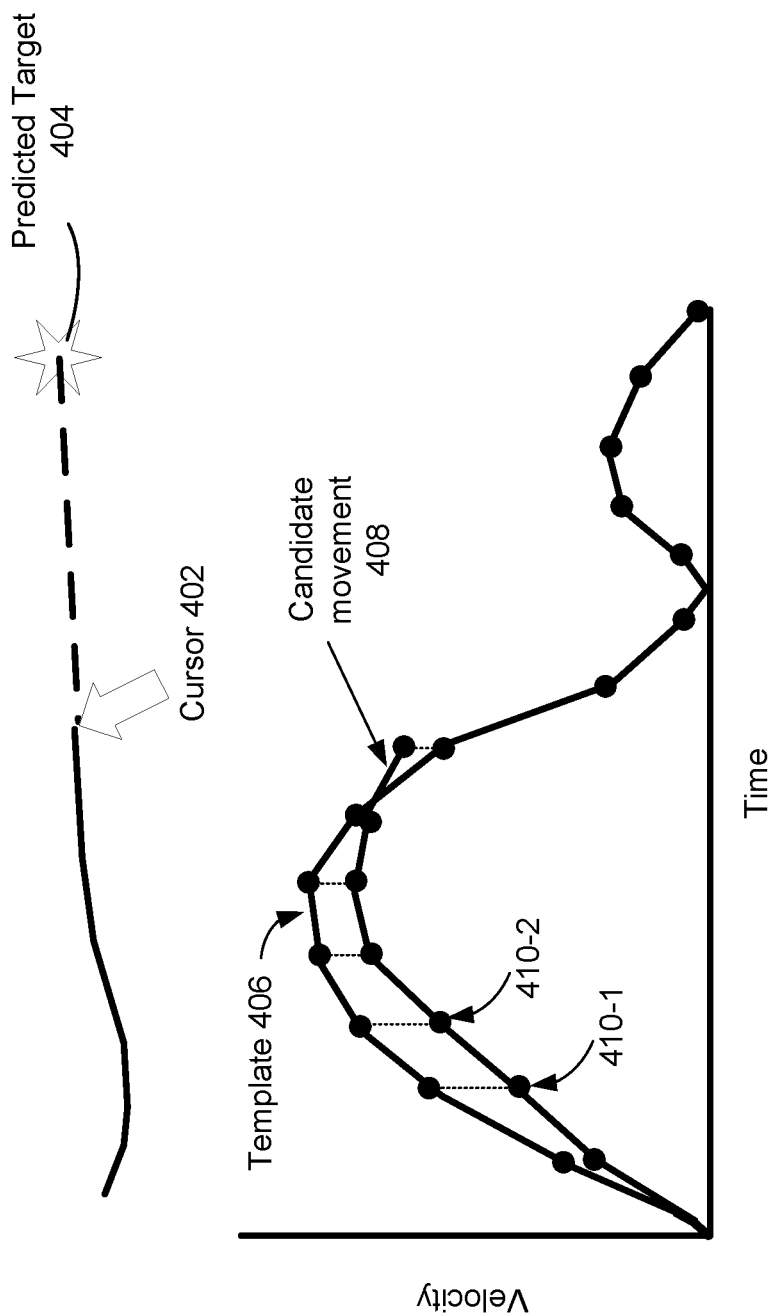
FIG. 4 illustrates comparing a partial candidate movement to a known template in accordance with some embodiments.

FIG. 4 illustrates a kinematic template matching (KTM) technique that uses a velocity profile of a cursor as a 2D stroke gesture, which allows it to be recognized using a template matching algorithm. Endpoint prediction techniques are used to predict where the user will click while the mouse is still in motion. In a 2D environment, endpoint prediction techniques include regression-based extrapolation, target classification, and kinematic template matching (illustrated in FIG. 4).

Regression-based extrapolation uses existing models of cursor movement behaviors to predict the location of a distance target based on a partial movement. Target classification uses knowledge of targets in the environment to identify a most probable candidate target. For example, calculating a cumulative score for each target based on the cursor's angle of movement.

As illustrated in FIG. 4, KTM considers the velocity profile of a partial pointing movement as a 2D stroke gesture, and then compares it to a library of known "template" movements to predict the final cursor location. This technique offers a number of advantages over the other reviewed techniques: it is target-agnostic, user-adaptable, and easy to implement. The KTM approach is split into a four-step process: building a template library, preprocessing new candidate pointing movements, performing the template matching, and estimating the cursor endpoint.

In the first step of KTM, a library of templates is generated using a collection of previous pointing movements. For example, each template consists of a velocity curve (e.g., the velocity curve template 406), describing previously determined (e.g., logged) velocity movements and the associated distance travelled. The template is then compared to the current movement, which is tracked by the velocity of the cursor 402 as it progresses towards the target (e.g., the predicted target 404), and its associated total distance travelled.

In some embodiments, the velocity profiles are truncated to remove overshoots, and then resampled (e.g., to 20 Hz). In some embodiments, the library consists of approximately 1000 templates. In some embodiments, the technique compares a user's movement (e.g., as represented by the velocity curve of candidate movement 408) to the user's own personal library of templates (e.g., excluding templates associated with other users). This allows the results to be personalized to each individual's pointing behaviors.

The next stage in the process occurs when a new pointing movement is being made (e.g., a candidate movement 408). For example, the associated velocity profile is resampled to 20 Hz and smoothed using a Gaussian filter. To prepare for template matching, each template in the library is truncated to match the duration of the candidate movement, and the same smoothing is then applied. In some embodiments, the smoothing of the templates happens after they are truncated.

Once this preprocessing is completed, the candidate movement is compared to each template (or a subset of the templates) in the library. This comparison occurs at the arrival of each new candidate movement point. In some embodiments, a cumulative scoring function is used to compare the candidate movement to the template. For example, the comparison may use the following cumulative scoring function:

$$S(T_i) = S(T_i^*) + \begin{cases} \dfrac{\sum_{j=0}^{n_c} |C_j - T_{ij}|}{n_c}, & n_c \leq n_t \\[2ex] \dfrac{\sum_{j=0}^{n_t} |C_j - T_{ij}| + \sum_{j=n_t+1}^{n_c} C_j}{n_c}, & n_c > n_t \end{cases} \quad (1)$$

where $T_i$ is the ith template in the library; $S(T_i)$ is the current score for the ith template; $S(T_i^*)$ is the prior calculated score, $C_j$ and $T_{ij}$ are the jth velocity values from the candidate's and current template's smoothed velocity profiles, respectively; $n_c$ is the number of points in the candidate's smoothed velocity profile; and $n_t$ is the number of points in the current template's smoothed velocity profile. In some embodiments, the cumulative scoring approach is used to help identify templates that match the candidate movement consistently across the arrival of each new candidate movement point. In some embodiments, once the candidate movement has been compared to at least some (or all) templates, one or more templates with the lowest scores are selected as the best match.

For example, FIG. 4 shows a velocity curve of a candidate movement 408 (corresponding to the movement of the cursor 402 performing a stroke from left to right) being compared to a velocity curve of the template 406. At each candidate movement point 410 (e.g., the candidate movement points 410-1 and 410-2), a comparison is performed. Then, the cumulative scoring function is used to compare the candidate movement 408 with the template 406.

Finally, to predict the candidate movement's final end-point (e.g., the predicted target 404), the travel distance associated with the best matched template is used (e.g., by applying that distance to the current direction of the candidate's movement from the original start point). In some embodiments, as with other endpoint prediction techniques, the accuracy of KTM improves as the candidate movement progresses towards the target. In some embodiments, a set of two of more best matching templates are used, and the predicted target is a weighted average of the templates (e.g., weighted according to their similarity to the candidate movement).

Figure 5B:
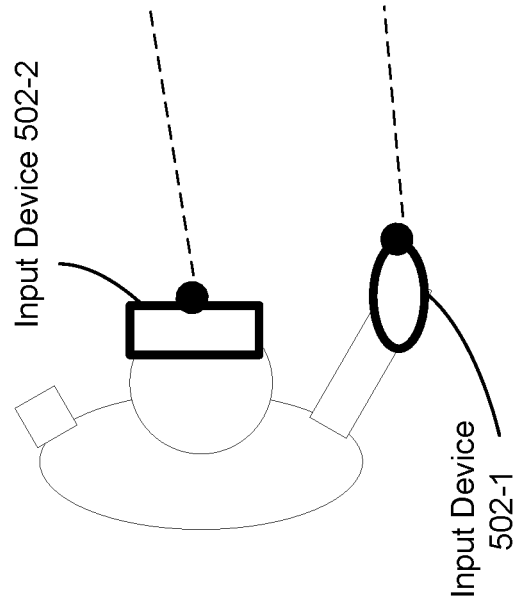
FIGS. 5A and 5B illustrate top views of a ray cursor acquisition movement in accordance with some embodiments.
Figure 5A:
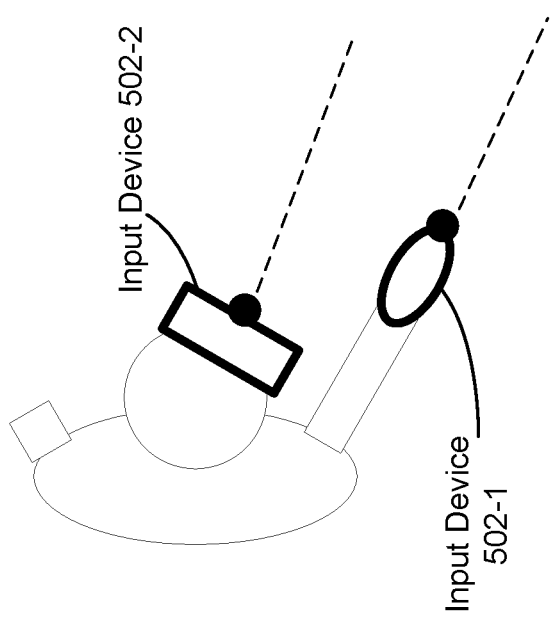

As shown in FIGS. 5A and 5B, in some embodiments, a predictive model for 3D ray cursor pointing is used. In some embodiments, a 3D ray cursor that operates like a virtual laser pointer is used as the input device (e.g., the first input device 502-1). A user, in a 3D environment (e.g., an Artificial Reality (AR) and/or Virtual Reality (VR) 3D environment), uses a handheld controller (e.g., with six degrees of freedom—referred to as "6-DOF") to specify an origin and direction of the ray. In some embodiments, the handheld controller has five or fewer degrees of freedom. For example, the first input device 502-1 is a handheld controller that emits a ray as an input device. In some embodiments, the final cursor location and direction is predicted, while the cursor movement progresses.

In some embodiments, a Kinematic Template Matching technique is used for 3D ray cursor selection. Because of the 3D environment, an "end point" per se (e.g., as 2D coordinates) is not predicted. Instead, the technique predicts a final position and direction of a ray (of the input device). The 3D coordinates of the handheld controller and the angle at which the ray is being emitted are measured. In some embodiments, the head (or and HMD) movement of the user is used to increase the accuracy of the predictions. For example, the head movement is measured by a forward direction vector (e.g., ray cursor) from the second input device 502-2 (e.g., an HMD).

In some embodiments, a top-n (where n is an integer greater than 1) approach to a best matching template is used. For example, a subset of n templates (from the library of templates) is used in the matching technique. In some embodiments, a weighted average of multiple matching templates is taken (e.g., to compensate for any individual matching inaccuracies). In some embodiments the weights are inversely proportional to the scores of the matching templates.

In some embodiments, the method for predicting the final position and direction of a 3D ray cursor includes the four phases of KTM: 1) building a template library; 2) preprocessing a candidate movement; 3) comparing the candidate movement to each template; and 4) calculating the cursor end-point (as explained above with reference to FIG. 4).

In some embodiments, the template library is built by capturing selection movements for known targets. The motion of the controller and the head (or the HMD) during selection are considered. Further, in a 3D environment, both the location and the angle of the controller (e.g., the first input device 502-1) and the head (or the HMD) (e.g., the second input device 502-2) are considered, as shown in FIGS. 5A and 5B.

FIGS. 5A and 5B illustrate top views of a three-dimensional ray cursor acquisition movement. Both the second input device 502-2 (e.g., the head or HMD of the user) and the first input device 502-1 (e.g., a handheld controller of the user) change in position and angle between a first time shown in FIG. 5A and a second time in FIG. 5B. In some embodiments, the change in position and/or angle is measured using accelerometers or other sensors (of the input devices).

Figure 6A:
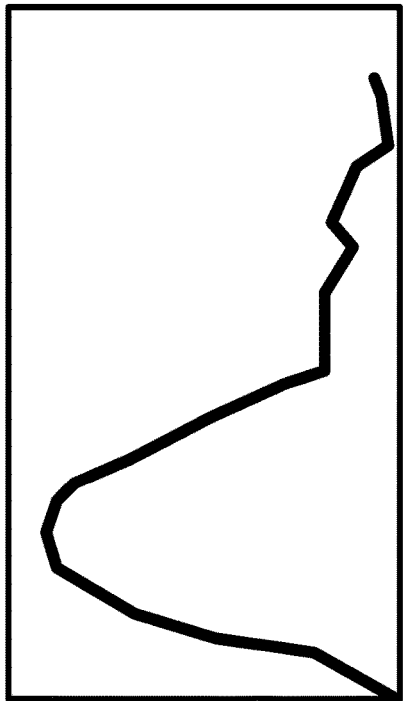
FIGS. 6A-6D illustrate a template with four velocity profiles in accordance with some embodiments.
Figure 6B:
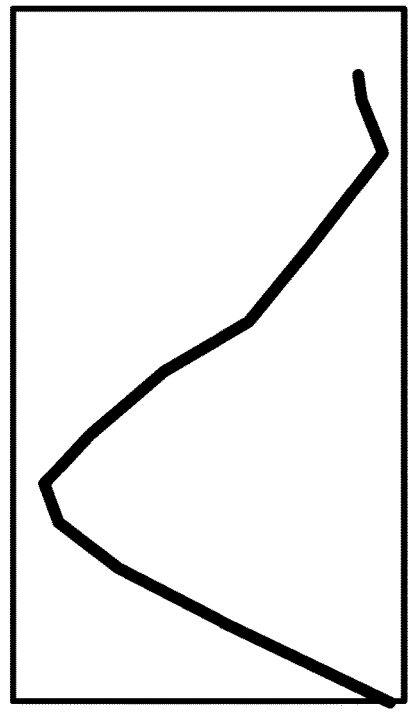
Figure 6C:
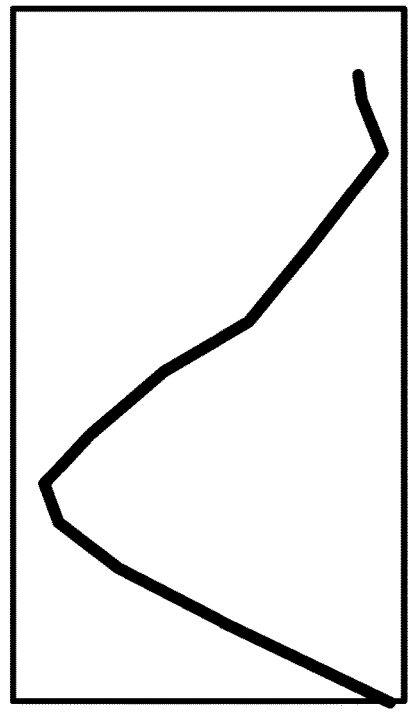
Figure 6D:
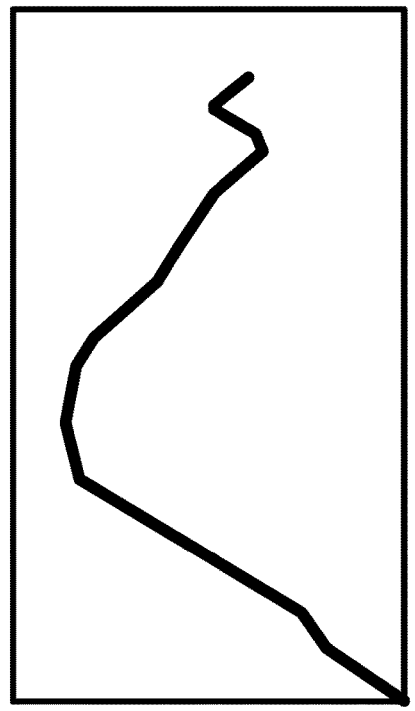

FIGS. 6A-6D illustrate a single template having four profiles:

a) a first profile in FIG. 6A showing controller positional velocity (CP) (e.g., the positional velocity of the controller);

b) a second profile in FIG. 6B showing controller angular velocity (CV) (e.g., the angular velocity of the controller, defined by the change in angle of the controller's forward-facing vector over time);

c) a third profile in FIG. 6C showing head positional velocity (HP) (e.g., the positional velocity of the head, defined by the change in the HMD's (X, Y, Z) origin coordinates over time); and d) a fourth profile in FIG. 6D showing head angular velocity (HV) (e.g., the angular velocity of the head, defined by the change in angle of the HMD's forward-facing vector over time).

In this example, each individual template has four velocity profiles. In some embodiments, a template has one profile, such as the positional velocity of a first input device and/or the angular velocity of the first input device. In some embodiments, a template has two or three profiles. For example, some templates include only the controller and/or the head or HMD as profiles (e.g., movement parameters) of the template.

In some embodiments, the KTM technique modifies the template library to crop any backtracking from a template. In some embodiments, an initial smoothing of the templates is performed (e.g., to correct for noise introduced with midair 6-DOF devices). For example, a Gaussian smoothing operation is performed on each of the velocities using a 5-point window. The velocity profile is then resampled, for example to 20 Hz, in preparation for comparison to subsequent candidate movements.

In some embodiments, as a new candidate movement is captured, the position and angle values of the one or more input devices (e.g., the head or HMD and the controller) are collected. This is used to create the four partial velocity profiles illustrated in FIG. 6, which are smoothed using a 5-point Gaussian window, and resampled to 20 Hz as each new point is collected. Each velocity profile is then truncated in the template library when the profile is longer in duration than the candidate movement. In this way, the template profiles have the same length as the candidate movement.

In some embodiments, only one input device (e.g., a handheld controller) is used to generate templates and perform the template matching. For the input device, at least two movement parameters (e.g., angular velocity and positional velocity profiles) are captured for the device. The template is then based on the captured two movement parameters for that input device.

In some embodiments, more than two input devices are used to generate templates and perform the template matching. Thus, in some embodiments, the template consists of six or more movement parameters (e.g., velocity profiles).

The candidate movement C is then compared to each template $T_i$ at the arrival of each new movement point using a scoring function, such as the cumulative controller scoring function presented in Equation (1) above. In some embodiments, this scoring calculation is repeated at least four times (e.g., once for each of the four velocity profiles). The four scores are defined as $S_{cp}$, $S_{cv}$, $S_{hp}$, and $S_{hv}$, corresponding to the velocity profiles CP, CV, HP, and HV. The final cumulative scoring function, $S(T_i)$, is then defined as a weighted sum of the four individual scores:

$$S(T_i)=aS_{CP}(T_i)+bS_{CV}(T_i)+cS_{HP}(T_i)+dS_{HV}(T_i) \quad (2)$$

Here, a, b, c, and d are tuning parameters. Note that by setting a, c, and d to 0, the model reduces to KTM, using only the velocity profile of the controller angle.

In some embodiments, the n-best template matches are ranked using the minimum values of $S(T_i)$. To calculate the expected final movement angle of the ray, a weighted average of the movement angles of the top n templates is taken. In some embodiments, the weight $w_i$ for each template $T_i$ is the reciprocal of its score $S(T_i)$ and the associated movement angle distance is $d_i$. Using these values, the weighted average angular distance is calculated as:

$$\mu = \frac{\sum_{i=1}^{n}(w_i * d_i)}{\sum_{i=1}^{n} w_i} \quad (3)$$

Using this weighted average angular distance ($\mu$), the controller's initial angle is rotated by the magnitude of $\mu$, along the current angle of motion.

The same approach is used to calculate the expected controller location. Using the weighted average of the top-n template controller distances, the magnitude of this average is added to the initial controller position along the current direction of movement.

To select a value for n in the top-n matching templates, the four weighting components were set equal (a, b, c, d=1), and the cumulative accuracy of all trials across all participants using different values of n was calculated. In some embodiments, empirical testing indicates that n=7 produces good results while minimizing computational complexity.

In some embodiments, to select weighting values for the scoring function (e.g., the values a, b, c, and d in Equation (2), a tuning procedure is used with various combinations of individual components, optimizing for the accuracy of the model at 40% of the movement progress.

Figure 7:
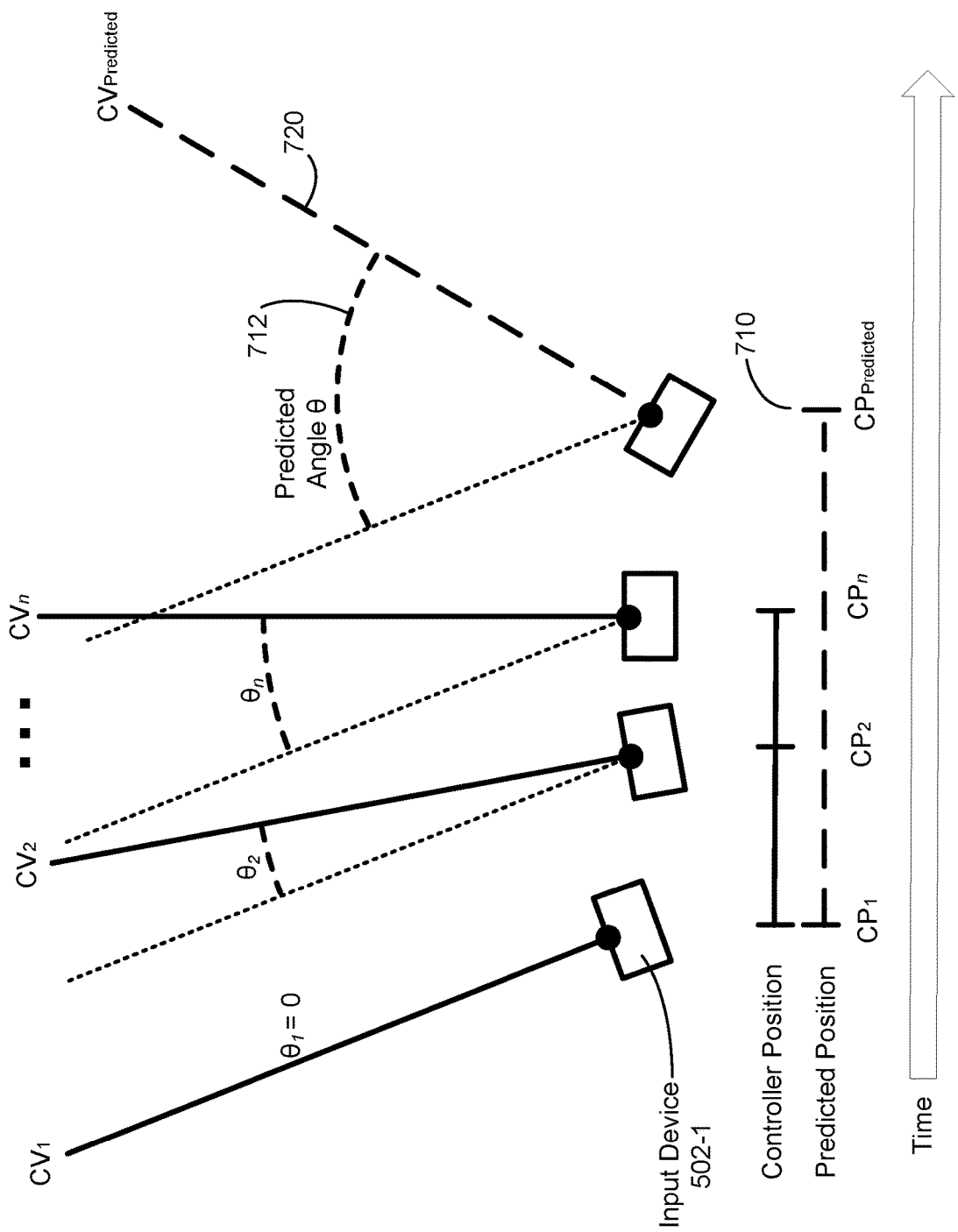
FIG. 7 illustrates predicting a final angle and position of a controller in accordance with some embodiments.

FIG. 7 illustrates that the predicted angle 712 and the predicted location 710 are combined to obtain the predicted ray cursor 720. Note that the goal target ray may represent any position on the path of the predicted ray 720. For example, the final measured angle $\theta_n$ and the final measured position $CP_n$ of the controller are used to predict the final location of the ray cursor (from the input device 502-1).

Figure 8:
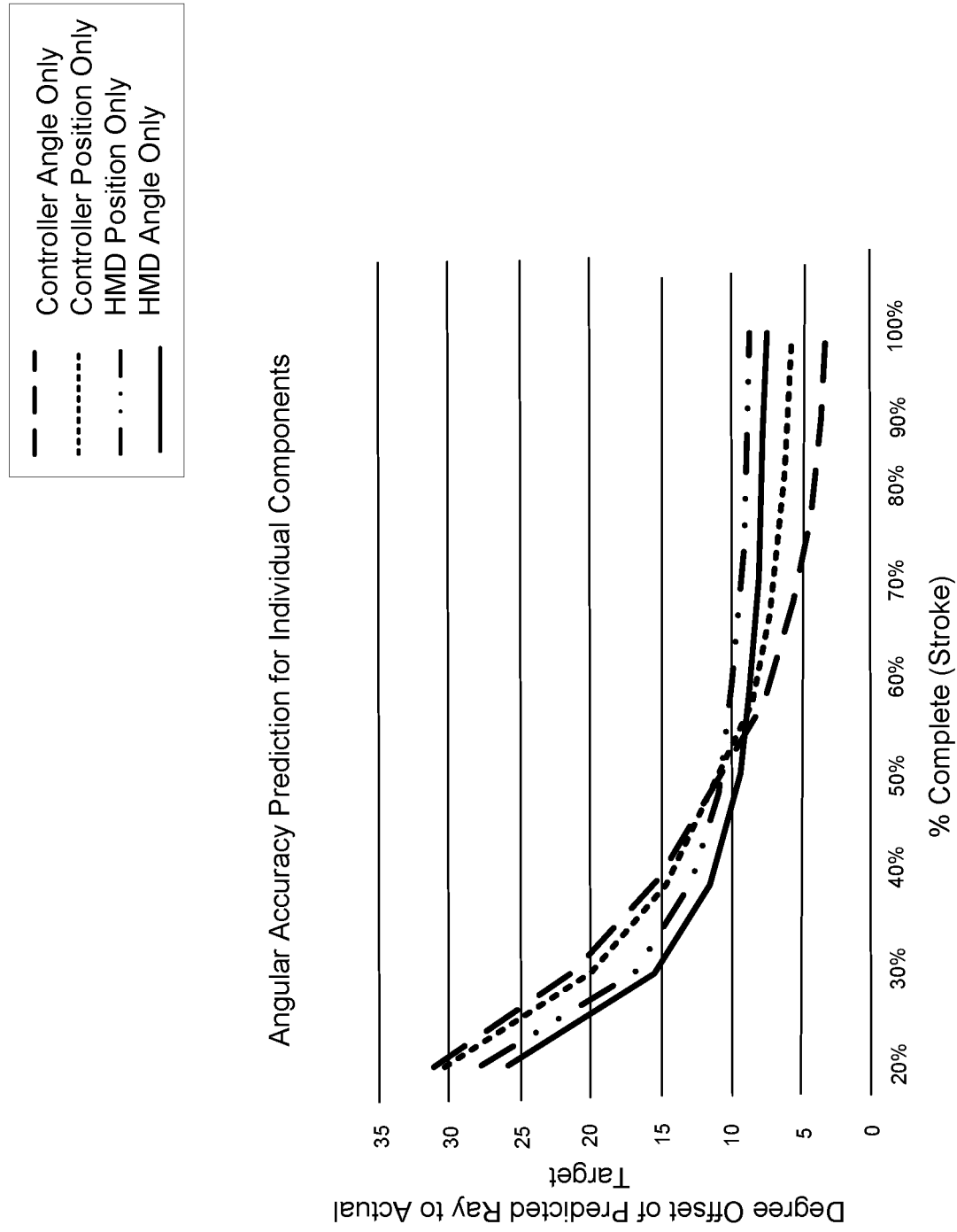
FIGS. 8 and 9 illustrate angular accuracy for predictions using different methods in accordance with some embodiments.

FIG. 8 illustrates the prediction accuracy that may be elicited by each input channel's velocity curve at different stages of stroke completion.

As illustrated in FIG. 8, the HMD angle provides the best indicator for the first half of the movement, but it is quickly overtaken by the controller angle around 55% of the way through the motion. By weighing the relative importance of each of the four individual components (e.g., shown in the graph of FIG. 8), the values of a=0.95, b=0.5, c=0.86, d=1 were selected. These are referred to as proposed model HC-KTM-7, for "Head-Coupled KTM", with n=7. One of skill in the art recognizes that other values of weights a, b, c, and d can be selected, as well as different values for n.

Figure 9:
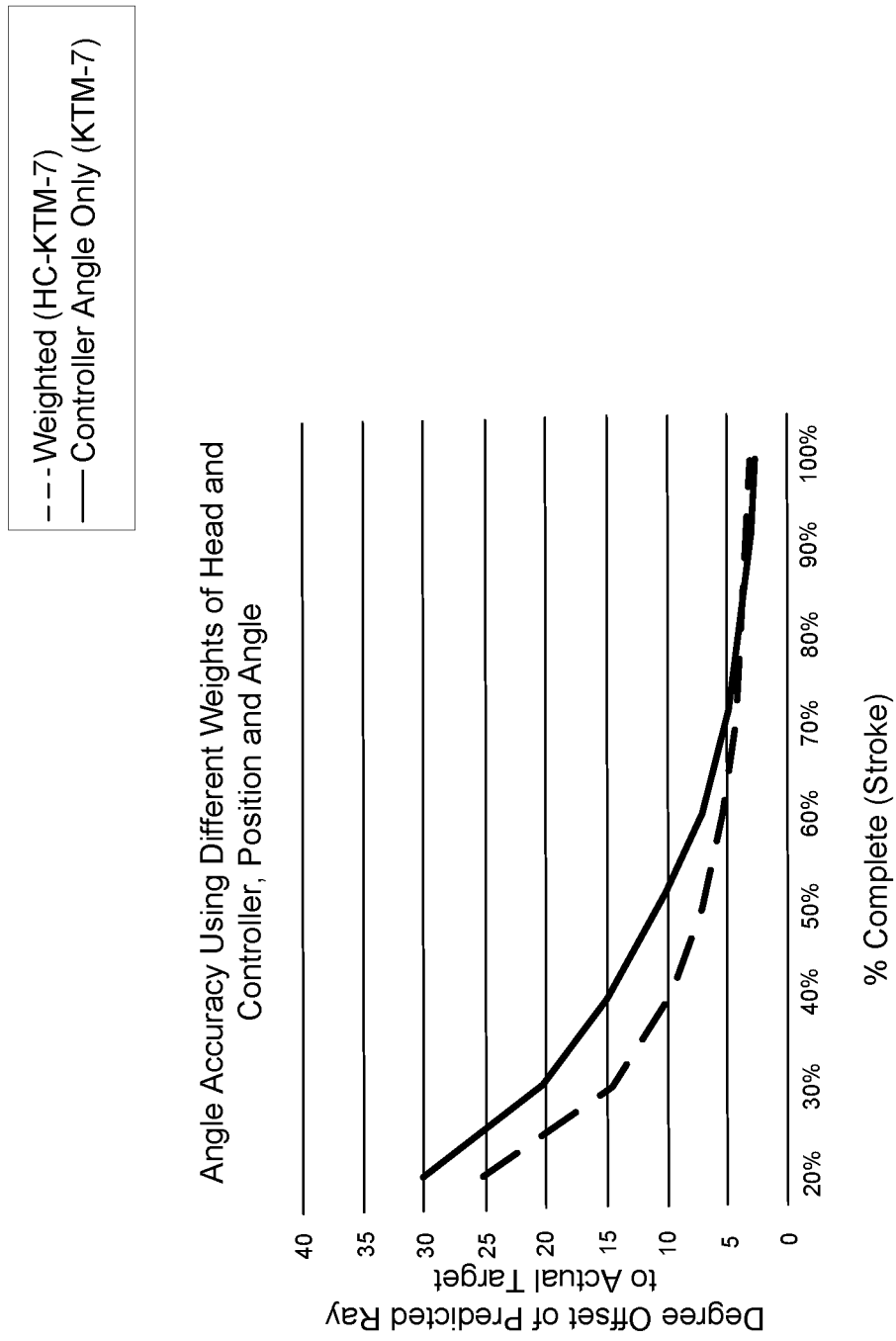

FIG. 9 is a graph showing the result of the weighted model (HC-KTM-7) compared to KTM-7 (where KTM-7 considers only the angular velocity of the controller). As explained above, the weighted model considers the angular and positional velocity for the controller and the angular and positional velocity for the HMD. The weighted model, HC-KTM-7 outperformed the baseline KTM-7 technique for early predictions. As a movement is nearing completion, both methods provide essentially the same accuracy.

While KTM-7 is more accurate than HC-KTM-7 at 90% movement completion, the Head Couple (HC-KTM-7) method was selected to be accurate at 40% completion, and by the second half of the movement, the controller is a better indicator of intent (as explained with reference to FIG. 8). This indicates that incorporating the head (or HMD) movements within a predictive model allows predictions to be made earlier (e.g., at a lower percent of completion of a user's stroke).

FIG. 10 is a flow diagram showing a method of predicting a future position and direction of a ray in a 3D space (e.g., AR and/or VR 3D environments), in accordance with some embodiments. Operations (e.g., steps) of the method 1100 may be performed by any of the artificial-realty devices described herein (or any combination thereof). The method 1100 may be performed on a large video display. At least some of the operations shown in FIG. 11 correspond to instructions stored in a computer memory or computer-readable storage medium (e.g., memory discussed above with references to FIGS. 1-3). For example, the operations of the method 1100 may be performed, at least in part, by an artificial-reality generation module and a display module.

As one example, the method 1100 may be performed (1102) at an electronic device. The method 1100 can be performed at other devices/systems discussed herein (e.g., at any of the devices discussed in FIG. 1, 2, or 3, or combinations thereof). In some embodiments, the electronic device includes a display (e.g., an HMD). In some embodiments, the electronic device is coupled to a large display.

In some embodiments, the method 1100 includes selecting (1104) a subset of templates from a library of templates. Each template in the library of templates comprises logged movements of one or more predefined input device types in a 3D space. Each template includes tracking data for one or more movement parameters. In some embodiments, each template comprises logged movements of a first input device type (e.g., a controller) and a second input device type (e.g., an HMD). For each input device type, at least one movement parameter is measured. In some embodiments, for each input device type, at least two movement parameters are measured.

In some embodiments, the libraries are optimized to eliminate templates that are similar because many strokes are potentially similar. In some embodiments, the templates are scaled (e.g., for a smaller subset of templates) to result in faster computational time and allow for better template fitting.

In some embodiments, the one or more movement parameters of each template include a positional velocity and/or an angular velocity of the one or more input device types. For example, for each input device type (e.g., a handheld controller and an HMD), a positional velocity and an angular velocity are tracked (as described with reference to FIG. 6). In some embodiments, the one or more movement parameters of each template include the acceleration of the one or more input devices.

In some embodiments, the subset of templates includes seven of the templates from the library of templates. The seven templates are selected based on similarities between the seven templates and the tracked movements. In some embodiments, the number of templates to be included in the subset (e.g., to be included in a top-n matching algorithm) is determined based on which templates most closely match the current movements of the user. In some embodiments, the subset of templates includes all of the templates in the library of templates.

In some embodiments, the subset of templates is selected based in part on the user. For example, subset of templates represents templates created from historical movements of the user. In some embodiments, the library of templates (or a subset of templates from the library) corresponds to templates created by the user's previously tracked (e.g., logged) movements. In some embodiments, the template matching is individualized for a personal style of the user. In some embodiments, the subset of templates includes templates generated for more than one user (e.g., a general population of users). In some embodiments, the model is personalized to individual users. For example, the algorithm is tuned to each user as it only compares to their own templates. Training data is then needed for each user. In some embodiments, there are different categories of users and templates associated with each category of users. For example, one classification may group together expert users versus novice users (and the subset of templates is selected in accordance with the classification of each user). In some embodiments, templates in the library are scaled to better match the current movements of the user, and then in turn, the predicted ray position is modified accordingly. In some embodiments, templates in the library are hand-crafted to represent prototypical user movements.

In some embodiments, a new user is initialized with a generic template library, and the system slowly replaces that library with the user's own templates as more known movements are collected.

The method includes tracking (1106), for a user, movement parameters of at least one input device of the user. The at least one input device corresponds to one of the predefined input device types. For example, the angular velocity and the positional velocity are tracked for at least one input device (e.g., a handheld controller and/or an HMD) of the user.

In some embodiments, the at least one input device of the user includes a hand (or finger) of the user and/or a handheld controller of the user.

In some embodiments, the at least one input device of the user includes the user's head (or an HMD).

In some embodiments, the at least one input device includes two input devices. In some embodiments, the at least one input device of the user includes a hand of the user and the head (or HMD) of the user and the tracked movement parameters comprise movement parameters of the hand of the user and movement parameters of the head (or HMD) of the user. For example, as shown in FIG. 6, the positional velocity and the angular velocity movement parameters are measured for each of the input devices of the user (e.g., the HMD and the controller).

In some embodiments, the tracked movement parameters of the at least one input device of the user is not a full movement of the user. For example, the full movement of the user corresponds to the user moving the at least one input device to the end of the stroke movement (e.g., when the user stops the movement to, for example, select a target). In some embodiments, the full movement of the user corresponds to an end point of the stroke where a target would be selected in the 3D space.

The method includes comparing (1108) the tracked movement parameters of the at least one input device of the user to the movement parameters for the subset of the templates selected from the library of templates. In some embodiments, comparing the tracked movement parameters of the at least one input device of the user to the movement parameters for the subset of templates comprises generating a weighted score for each movement parameter of the tracked movement parameters. In some embodiments, the weighted score (e.g., cumulative scoring function) is given by equation (2). In some embodiments, the weights are equal. In some embodiments, the weights are selected based on a quality of the template (e.g., some templates have greater weights because they are closer to the tracked movement). In some embodiments, probability distributions are used to help influence predictions.

The method includes predicting (1110), based on the comparison, a goal target ray, within the 3D space. In some embodiments, the goal target ray is displayed on the display for the user. For example, as shown in FIG. 7, a predicted controller position (CP) and a predicted controller angle (CV) are determined based on the tracked movement parameters of the controller. In some embodiments, the goal target ray corresponds to an end point of a ray cursor (e.g., the user input device). In some embodiments, the prediction of the goal target ray comprises a prediction of a movement (e.g., position and direction) of a ray cursor (e.g., created by the input devices). In some embodiments, predicting comprises using, for example, Equation 3, to calculate an expected angular distance and/or expected position of the at least one input device of the user.

In some embodiments, the prediction is generated while the user input device (e.g., cursor movement) is still in progress in 3D environments. For example, before the user has completed the full stroke (e.g., at 40% of completion of the stroke).

In some embodiments, the weights of the weighted score change dynamically for different portions of the user input. For example, the prediction is made based on tracked movement parameters for a first portion of user input using a first input device and based on tracked movement parameters for a second portion of the user input using a second input device (e.g., the first portion is the head (or HMD) movement and the later portion is a hand movement). For example, as shown in FIG. 9, the HMD angle and position provide a more accurate prediction in the first portion of the movement (e.g., the first 50% of the stroke), and the controller angle and controller position provide a more accurate prediction for the second portion of the movement (e.g., the last 50% of the stroke). Thus, different user input devices (e.g., different device types) are weighted differently at different moments of the complete movement (e.g., stroke).

In some embodiments, the prediction is made based on only a first portion of the tracked movement parameters of the at least one input device of the user (e.g., the first 50 percent of the user's movement). In some embodiments, the prediction is made before the user completes the movement. For example, before the user completes the full stroke, the prediction of the goal target ray is displayed to the user. In some embodiments, in response to the prediction, the goal target ray is automatically selected (e.g., without additional user input).

In some embodiments, the tracked movement matches (e.g., or corresponds to) a known template (e.g., a template that exists in the library of templates) and the prediction is based on the known template. For example, instead of using a subset of templates that includes multiple templates from the library, the subset comprises one template (e.g., one that closely matches the user's movement). In some embodiments, the tracked movement does not correspond to a known template (e.g., from the library of templates) and the prediction is based on an average of the aggregated subset of the library of templates.

In some embodiments, as the user's movement progresses (e.g., as the stroke completion increases), the tracked movement parameters of the at least one input device of the user change (1112). In some embodiments, in response to the change in the tracked movement parameters of the at least one input device of the user, the predicted goal target ray is updated (1114) based on the change in the tracked movement parameters. In some embodiments, the tracked movement parameters do not change (e.g., continue to follow a predicted template), and the electronic device continues to display (1116) the goal target ray.

In some embodiments, the method further includes displaying, on the display, a visualization of the goal target ray based on the prediction. In some embodiments, the visualization comprises zooming or highlighting the predicted target.

In some embodiments, the method further includes prefetching content based on the prediction. For example, the method improves latency by preloading content into the 3D space (e.g., before the user has completed the movement/ selected the target).

In some embodiments, the visualization comprises an augmentation of the cursor itself (e.g., bending or expanding its size), an augmentation of the target to help the user (e.g., resizing the target(s), or use different target arrangements), an adjustment to the ratio of the controller's perceived movement, or highlighting targets in a different manner.

In some embodiments, displaying the visualization causes a change in the user's behavior. For example, if one employs a technique to change how the cursor moves, this may in turn change users' behavior, affecting the performance of the model. For example, the prediction should be updated in accordance with the user's movements.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated. Furthermore, the various components and embodiments described herein may be combined to form additional embodiments not expressly described.

What is claimed is:

1. A method of predicting future positions and directions of one or more input devices in 3D spaces, comprising:
   at an electronic device having a display, one or more processors, and memory storing one or more programs having instructions for:
   selecting a subset of templates from a library of templates, wherein each template in the library of templates comprises logged movements of one or more predefined input device types in a 3D space and each template includes tracking data for one or more movement parameters;
   tracking, for a user, movement parameters of at least one input device of the user, the at least one input device corresponding to one of the predefined input device types;
   comparing the tracked movement parameters of the at least one input device of the user to the movement parameters for the subset of the templates; and
   predicting, based on the comparison, a goal target ray, within the 3D space.

2. The method of claim 1, wherein the one or more movement parameters of each template comprise a positional velocity and an angular velocity of the one or more predefined input device types.

3. The method of claim 1, wherein the subset of templates comprises seven templates from the library of templates, the seven templates selected based on similarities between the seven templates and the tracked movement parameters of the at least one input device of the user.

4. The method of claim 1, wherein comparing the tracked movement parameters of the at least one input device of the user to the movement parameters for the subset of templates comprises generating a weighted score for each movement parameter of the tracked movement parameters.

5. The method of claim 4, wherein the weights of the weighted score change dynamically for different portions of the user input.

6. The method of claim 1, wherein the at least one input device of the user comprises a hand of the user or a handheld controller of the user.

7. The method of claim 1, wherein the at least one input device of the user comprises a head of the user.

8. The method of claim 1, wherein:
   the at least one input device of the user comprises a hand of the user and a head of the user; and
   the tracked movement parameters comprise movement parameters of the hand of the user and movement parameters of the head of the user.

9. The method of claim 1, wherein the tracked movement parameters of the at least one input device of the user is not a full movement of the user.

10. The method of claim 1, wherein the prediction is made based on only a first portion of the tracked movement parameters of the at least one input device of the user.

11. The method of claim 1, further comprising, displaying, on the display, a visualization of the goal target ray based on the prediction.

12. The method of claim 11, wherein the visualization comprises zooming or highlighting the predicted target.

13. The method of claim 1, wherein the subset of templates is selected based in part on the user.

14. The method of claim 1, further comprising, prefetching content corresponding to the goal target ray before the user makes the goal target ray.

15. The method of claim 1, wherein the movement parameters are tracked using accelerometers or other sensors on the at least one input device of the user.

16. An electronic device comprising:
a display;
one or more processors; and
memory storing one or more programs having instructions for:
selecting a subset of templates from a library of templates, wherein each template in the library of templates tracks movements of one or more predefined input device types in a 3D space and each template includes tracking data for one or more movement parameters;
tracking, for a user, movement parameters of at least one input device of the user, the at least one input device corresponding to one of the predefined input device types;
comparing the tracked movement parameters of the at least one input device of the user to the movement parameters for the subset of the templates; and
predicting, based on the comparison, a goal target ray, within the 3D space, displayed on the display for the user.

17. The electronic device of claim 16, wherein the one or more movement parameters of each template comprise a positional velocity and an angular velocity of the one or more predefined input device types.

18. The electronic device of claim 16, wherein the at least one input device comprises a first input device and a second input device, and the prediction is made based on tracked movement parameters for a first portion of user input using the first input device and based on tracked movement parameters for a second portion of the user input using the second input device.

19. The electronic device of claim 16, further comprising, displaying, on the display, a visualization of the goal target ray based on the prediction, wherein the visualization comprises zooming or highlighting the predicted target.

20. The electronic device of claim 16, further comprising, prefetching content corresponding to the goal target ray before the user makes the goal target ray.

* * * * *